US007884854B2

(12) United States Patent
Banner et al.

(10) Patent No.: US 7,884,854 B2
(45) Date of Patent: Feb. 8, 2011

(54) REDUCING MOTION BLUR FROM AN IMAGE

(75) Inventors: Ron Banner, Haifa (IL); Carl Staelin, Haifa (IL)

(73) Assignee: Hewlett-Packard Development Company, L.P., Houston, TX (US)

( * ) Notice: Subject to any disclaimer, the term of this patent is extended or adjusted under 35 U.S.C. 154(b) by 791 days.

(21) Appl. No.: 11/827,543

(22) Filed: Jul. 11, 2007

(65) Prior Publication Data

US 2009/0015719 A1   Jan. 15, 2009

(51) Int. Cl.
   *H04N 5/228*   (2006.01)
   *H04N 5/217*   (2006.01)
(52) U.S. Cl. .............................. 348/208.99; 348/208.1; 348/208.4; 348/208.6; 348/241
(58) Field of Classification Search ............ 348/208.99, 348/208.1, 208.3–208.6, 208.12, 222.1, 241; 396/52–55, 153; 382/255, 280, 296
See application file for complete search history.

(56) References Cited

U.S. PATENT DOCUMENTS

2005/0243178 A1* 11/2005 McConica ............. 348/208.99

OTHER PUBLICATIONS

Moghaddam, et al., "Motion Blur Identification in Noisy Images Using Mathematical Models and Statistical Measures", *Science Direct: Pattern Recognition*, (2006),1946-1957.

* cited by examiner

*Primary Examiner*—David L Ometz
*Assistant Examiner*—Richard Bemben

(57) ABSTRACT

A method for reducing blur from an image is described. The method includes accessing a blurred image, wherein the blurred image has a width and a length that can be different. The method further includes converting the blurred image into a frequency domain representation of the blurred image and determining an angle of blur from the frequency domain of the blurred image. The method further includes rotating the frequency domain representation of the blurred image by the angle of blur and determining a size of the blur from the rotated frequency domain representation of the blurred image. The method further includes determining a blur kernel associated with the blur, the blur kernel comprising the angle of blur and the size of said blur and de-convoluting the blurred image according to the blur kernel to reduce the blur.

17 Claims, 8 Drawing Sheets

REDUCING MOTION BLUR FROM AN IMAGE

TECHNICAL FIELD

The present invention is related to data processing. More specifically, embodiments of the present invention are related to reducing blur from an image.

BACKGROUND

Camera motion during exposure often leads to image blur that ruins many photographs. As the movement of the camera sensor produces an image that is the integration of the same object over different positions, the objects look blurred or smeared. Unfortunately, since camera shake is a chronic problem for photographers, this kind of blur appears very frequently in the real world.

Accordingly, a system and method for removing blurs from images would be beneficial.

SUMMARY OF THE INVENTION

A method for reducing blur from an image is described. The method includes accessing a blurred image, wherein the blurred image has a width and a length that can be different. The method further includes converting the blurred image into a frequency domain representation of the blurred image and determining an angle of blur from the frequency domain representation of the blurred image. The method further includes rotating the frequency domain representation of the blurred image by the angle of blur and determining a size of the blur from the rotated frequency domain representation of the blurred image. The method further includes determining a blur kernel associated with the blur, the blur kernel comprising the angle of blur and the size of said blur and de-convoluting the blurred image according to the blur kernel to reduce the blur.

BRIEF DESCRIPTION OF THE DRAWINGS

The above and other objects and advantages of the present invention will be more readily appreciated from the following detailed description when read in conjunction with the accompanying drawings, wherein.

DETAILED DESCRIPTION OF THE INVENTION

Figure 1:
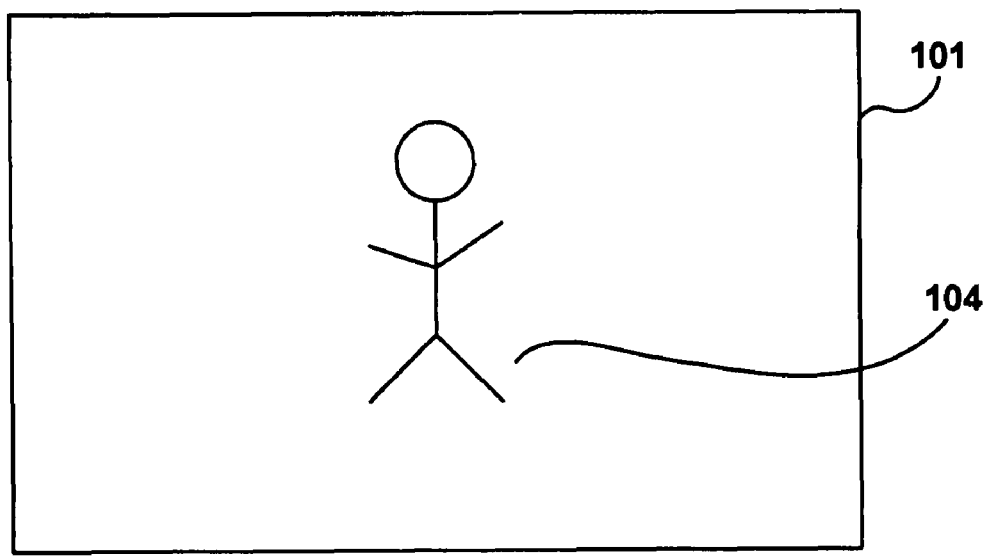
FIG. 1 is an illustration of an exemplary sharp image in accordance with embodiments of the present invention.

Reference will now be made in detail to embodiments of the present invention, reducing blurs from an image, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims.

Furthermore, in the following detailed description of the present invention, numerous specific details are set forth in order to provide a thorough understanding of the present invention. However, it will be recognized by one of ordinary skill in the art that the present invention may be practiced without these specific details. In other instances, well known methods, procedures, components, and circuits have not been described in detail as not to unnecessarily obscure aspects of the present invention.

Embodiments of the present invention provide a system and method for reducing blur from an image. In one embodiment, the present invention removes blur automatically from a single photograph without requiring user input. In one embodiment of the invention, the angle of blur and the velocity of the blur are estimated. This information is then used to de-blur the image.

The estimation returns two parameters for the motion of blur. The first is the angle of the motion with respect to the positive half-line of the image and the second is the size of the blur kernel that is associated with the magnitude of that velocity. The kernel of the motion is in essence an averaging filter in the direction of the motion. The size of the filter is associated with the level of blur that was caused by the motion. Specifically, if the motion has blurred (average) each pixel with K other pixels, the size of that filter is assumed to be K.

As typical exposure times are usually too small to induce complicated motion paths, in one embodiment of the invention, the motion of the blur is assumed to be linear (e.g., follow a straight path). In one embodiment, when the motion path is convoluted, embodiments of the present invention finds the linear motion vector that is the average of all non-linear motions that constitute the convoluted path. Embodiments of the present invention are well suited for assuming a linear blur motion for blur kernels in the range of approximately 1-20 pixels.

Embodiments of the present invention use two main steps to determine a motion blur kernel associated with a blurred image. The blur kernel can then be used to de-blur the image and reduce or remove the blur from the image. The first step is to estimate the angle of the motion and the second step is to determine the velocity of the motion (referred to as blur kernel size).

With these two parameters, the blur kernel can be defined and using standard de-convolution the image can be reconstructed with reduced blur. Embodiments of the present invention are well suited for removing blur from a single image and do not rely on previous or subsequent frames to determine the blur kernel associated with the blur. Furthermore, embodiments are well suited for images of various sizes and dimensions.

FIG. 1 is an illustration of an exemplary sharp image 101 in accordance with embodiments of the present invention. In sharp image 101, the person 104 is not blurred. For purposes of brevity and clarity, assume the image 101 is of size M×N. In one embodiment, M and N can be different. In other words, embodiments of the present invention are well suited for images that are square as well as images that are not square.

Figure 2:
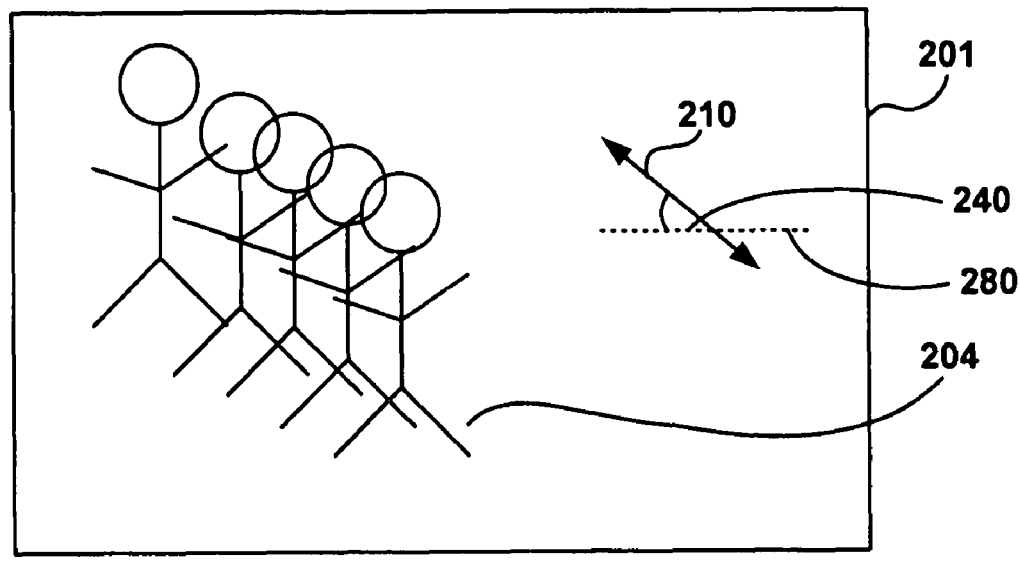
FIG. 2 is an illustration of a blurred image in accordance with embodiments of the present invention.

FIG. 2 is an illustration of a blurred image 201 in accordance with embodiments of the present invention. In the blurred image, the person 204 is blurred along motion 210. The motion 210 is at an angle 240 with respect to the horizontal half line 280. Embodiments of the present invention reconstruct the blurred image 201 to more closely resemble the sharp image 101 of FIG. 1. In one embodiment, embodiments of the present invention determine a blur kernel associated with the blurred image 201 that will enable reconstruction to the sharp image 101.

Figure 3:
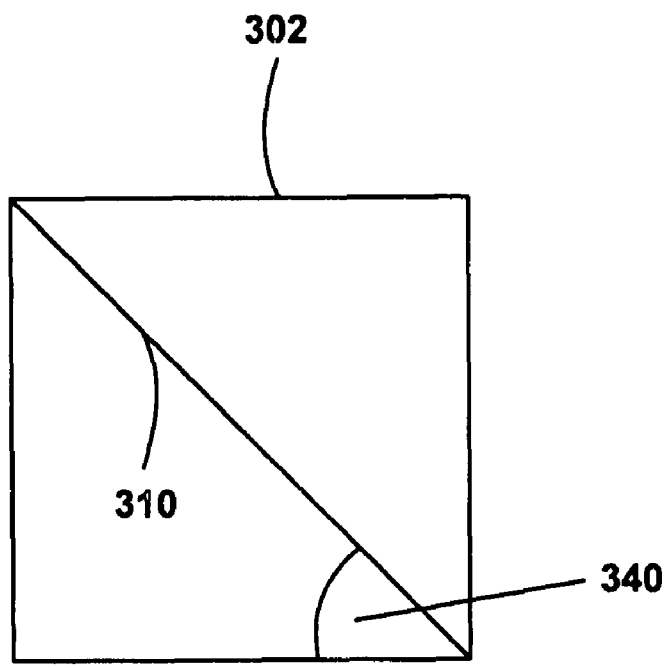
FIG. 3 is an illustration of an exemplary blur kernel in accordance with embodiments of the present invention.

FIG. 3 is an illustration of an exemplary blur kernel 302 in accordance with embodiments of the present invention. The blur kernel 302 in combination with the sharp image 101 of FIG. 1 would result in the blurred image 201 of FIG. 2. Blur kernel 302 includes a motion path 310 that is associated with motion 210 of FIG. 2. The angle 340 of motion path 310 is associated with the angle 240 of motion 210. In one embodiment, the angle 340 is measured with respect to the image's horizontal half-line 280.

As stated above, an Image I of size M×N was blurred by a motion across K pixels at an angle of θ (with respect to the horizontal half line). The kernel 302 of FIG. 3 can be described as h(K,θ). Thus, the resulting blurred image I' satisfies I'=I*h(K,θ)), where symbol * represents the convolution operator.

In one embodiment of the present invention, the product between the Fourier transforms of I and h(K,θ) is equal to the Fourier transform of I' (e.g., $\Im(I')=\Im(I)\cdot\Im(h\ k,\theta)$) where $\Im(\cdot)$ is the 2D Discrete Fourier Transform operation. Since this multiplication is defined on an element-by-element basis, the dimensions of $\Im(I)$ and $\Im(h(k,\theta))$ must be the same. Therefore, the motion blur kernel is padded in one embodiment of the invention prior to transforming the image into the frequency domain. In one embodiment, the motion blur is padded with zeros in the frequency domain to fit the dimensions of the image I. In one embodiment, inspecting the blurred image in the frequency domain enables estimation of the velocity and angle of the direction of motion that causes blur.

Figure 4:
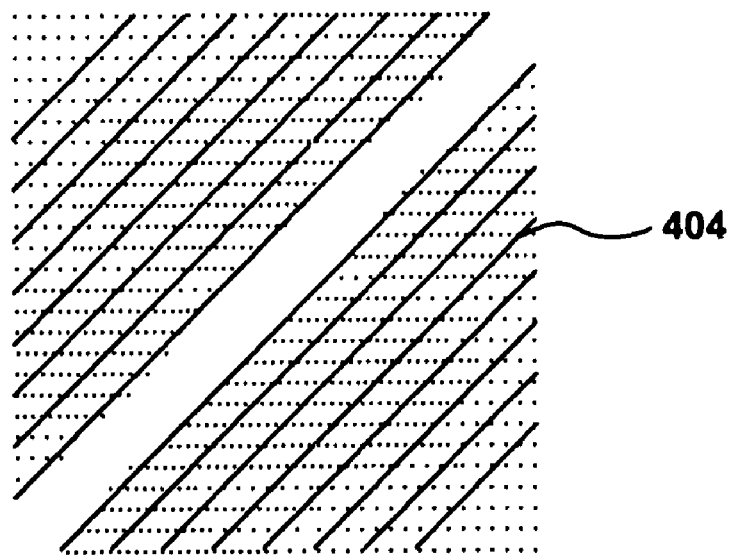
FIG. 4 is an illustration of the product of an image I with a padded motion blur kernel in the frequency domain in accordance with embodiments of the present invention.

FIG. 4 is an illustration of the product of an image I with a padded motion blur kernel in the frequency domain in accordance with embodiments of the present invention. In order to determine the orientation of the blur kernel (e.g., the angle of motion with respect to the half-line), it is sufficient to inspect the orientation of lines 404 that the blurred image has in the frequency domain. In one embodiment, these lines 404 in the frequency domain are always perpendicular to the orientation of the motion. To that end, in one embodiment, the estimated angle is used to rotate the image so that the orientation of the motion will be horizontal.

In one embodiment, the orientation of lines 404 can be approximated by projecting the image at a plurality of integral angles 419. The pixel values are then summed along the lines for each angle until a peak orientation is identified. The peak orientation corresponds to identifying a band of high pixel values from the blurred image in the frequency domain. The image can then be rotated by the corresponding angle (e.g., perpendicular to the band of high pixel values) to determine the blur kernel size.

Figure 5:
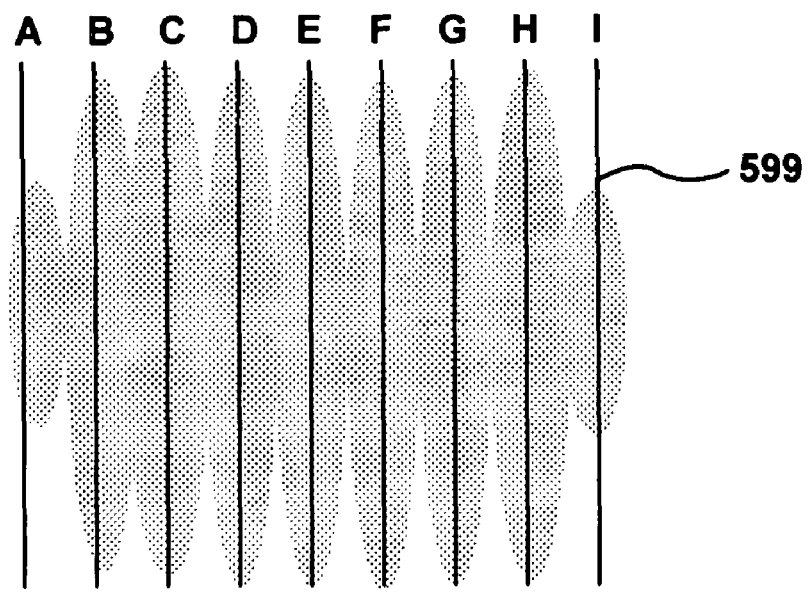
FIG. 5 is an illustration of an exemplary rotated image in the frequency domain in accordance with embodiments of the present invention.

FIG. 5 is an illustration of an exemplary rotated image in the frequency domain 510 in accordance with embodiments of the present invention. In one embodiment, the size of the motion blur kernel is precisely the number of vertical black lines 599 plus a constant value. In one embodiment, the constant value is one. As such, FIG. 5 shows precisely nine lines (A-I). Using one as the constant, the resulting size is equal to ten. In one embodiment, the size is associated with a number of pixels. For example, for the image in FIG. 5, the size of the blur kernel is equal to ten pixels.

As stated above, the number of black lines 599 in the rotated image in the frequency domain is precisely the size of the motion kernel minus a constant. In one embodiment, the number of black lines corresponds to the number of bands of low pixel values in the rotated image in the frequency domain.

In one embodiment of the invention the orientation of the motion in the spatial domain is always perpendicular to the orientation of the black lines that exist in the frequency domain. The size of the blur kernel can be inferred from the blurred image and estimated angle. Also, rotating the image so that the orientation of the motion will be horizontal and then transferring the rotated image into the frequency domain produces an image with several black lines. The number of black lines plus a constant describes the size of the blur kernel. Therefore, in one embodiment the present invention only needs to estimate the orientation and number of black lines that appear in the frequency domain to estimate the blur kernel associated with a blurred image. From the estimated blur kernel, the blurred image can be reconstructed to reduce the blur.

Figure 6A:
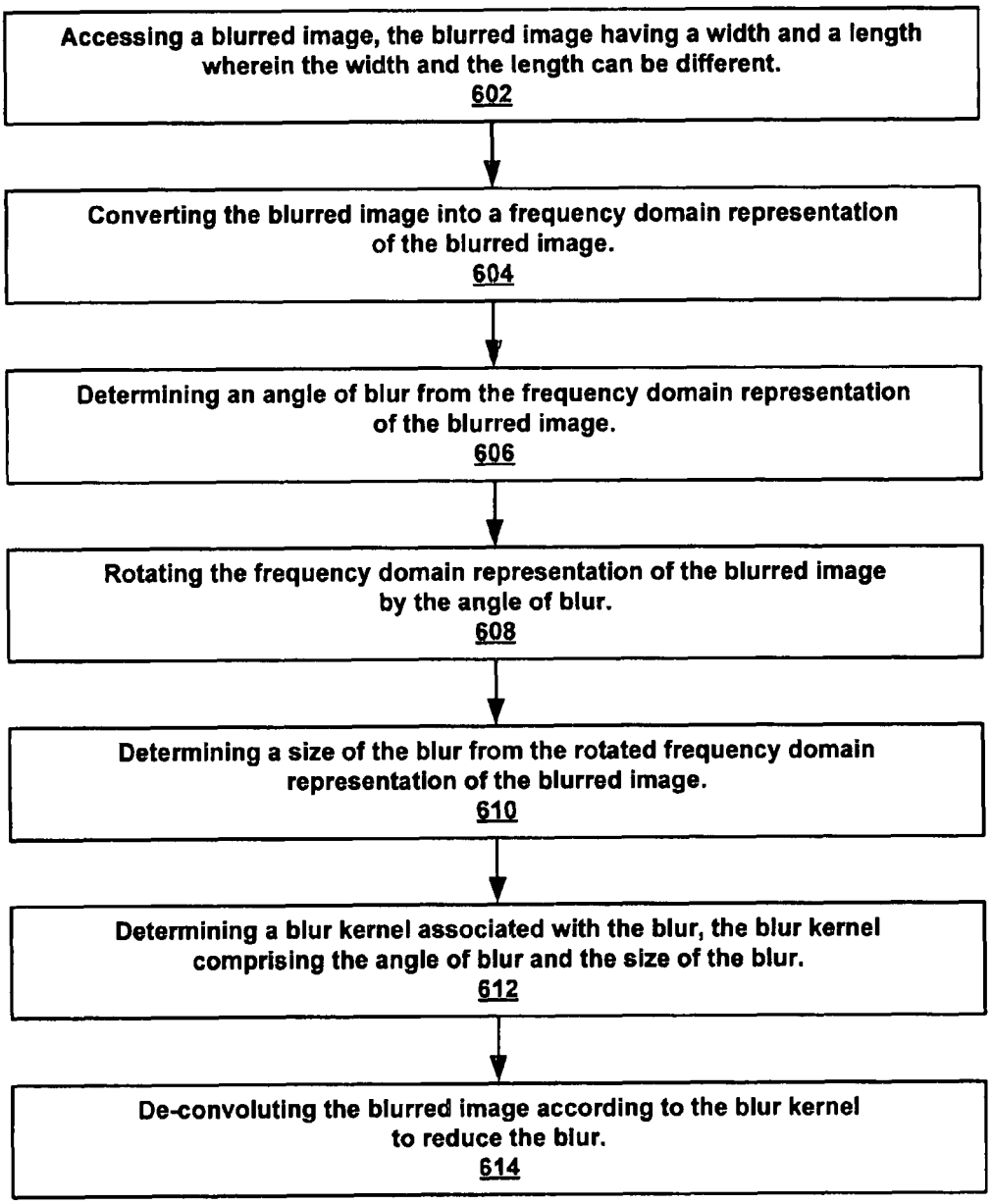
FIG. 6A is a flow diagram of an exemplary method for reducing blur in accordance with embodiments of the present invention.

FIG. 6A is a flow diagram of an exemplary method 600 for reducing blur in accordance with embodiments of the present invention.

At 602, 600 includes accessing a blurred image, said blurred image having a width and a length wherein the width and length can be different. As stated above, embodiments of the present invention are well suited to be used to reduce blur in images that are of various shape and dimension.

At 604, 600 includes converting said blurred image into a frequency domain representation of the blurred image.

At 606, 600 includes determining an angle of blur from the frequency domain of the blurred image. In one embodiment, 606 includes identifying a band of high pixel values in the domain frequency representation of the blurred image. In one embodiment, the angle of blur is perpendicular to an identified band of high pixel values.

At 608, 600 includes rotating the frequency domain representation of the blurred image by the angle determined in 606.

At 610, 600 includes determining a size of the blur from the rotated frequency domain representation of the blurred image. In one embodiment, the size of the blur is associated with a number of identified bands of low pixel values in the rotated frequency domain representation of the blurred image. In one embodiment, the size is the number of bands of low pixel value plus one.

At 612, 600 includes determining a blur kernel comprising the blur angle and the blur size. In one embodiment, the blur kernel determined in 612 can be used to reconstruct the blurred image into a sharpened image with reduced blur in accordance with embodiments of the invention.

At 614, 600 includes de-convoluting the blurred image according to the blur kernel determined in 612 to reduce the blur. In one embodiment, the image is de-convoluted automatically.

Figure 6B:
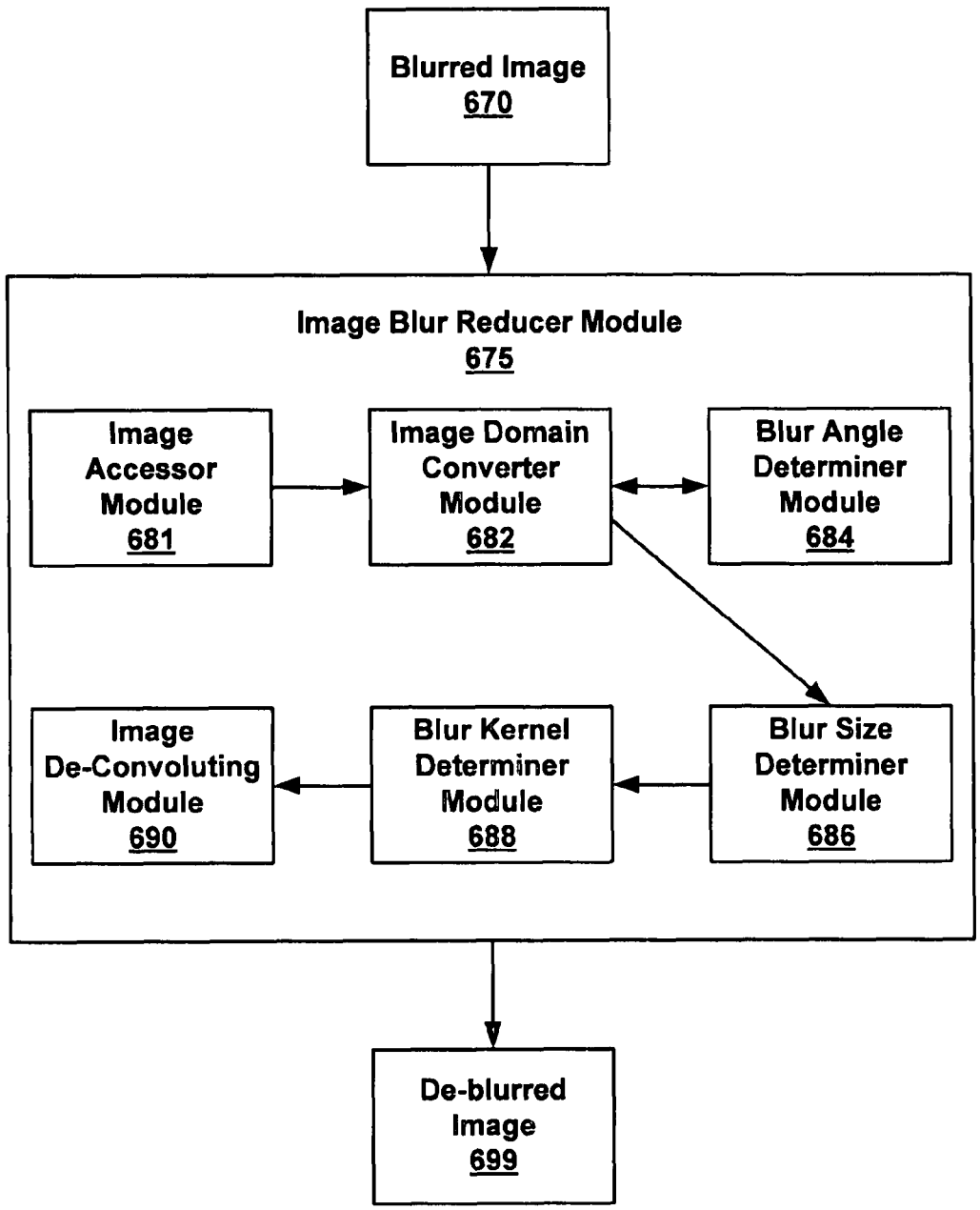
FIG. 6B is a block diagram of an exemplary system for reducing blur in accordance with embodiments of the present invention.

FIG. 6B is a block diagram of an exemplary system 675 for reducing blur in accordance with embodiments of the present invention. In one embodiment, the image blur reducer module accesses a blurred image 670 with an image accessor module 681. The blurred image is then converted to a frequency domain representation by the image domain converter module 682. A blur angle determiner module 684 determines the angle of blur from the domain frequency representation of the blurred image generated by the image domain converter module 682.

The image domain converter module 682 rotates the frequency domain representation of the blurred image by the angle determined by the blur angle determiner module 684. The blur size determiner module 686 determines a size of the blur kernel from the rotated frequency domain representation of the blurred image generated by the image domain converter module 682.

A blur kernel determiner module 688 generates a blur kernel comprising the blur angle determined by the blur angle determiner module 684 and the blur size determined by the blur size determiner module 686. The image de-convoluting module 690 uses the blur kernel determined by the blur kernel determiner module 688 to generate a de-blurred image 699.

Exemplary Computer System

Figure 7:
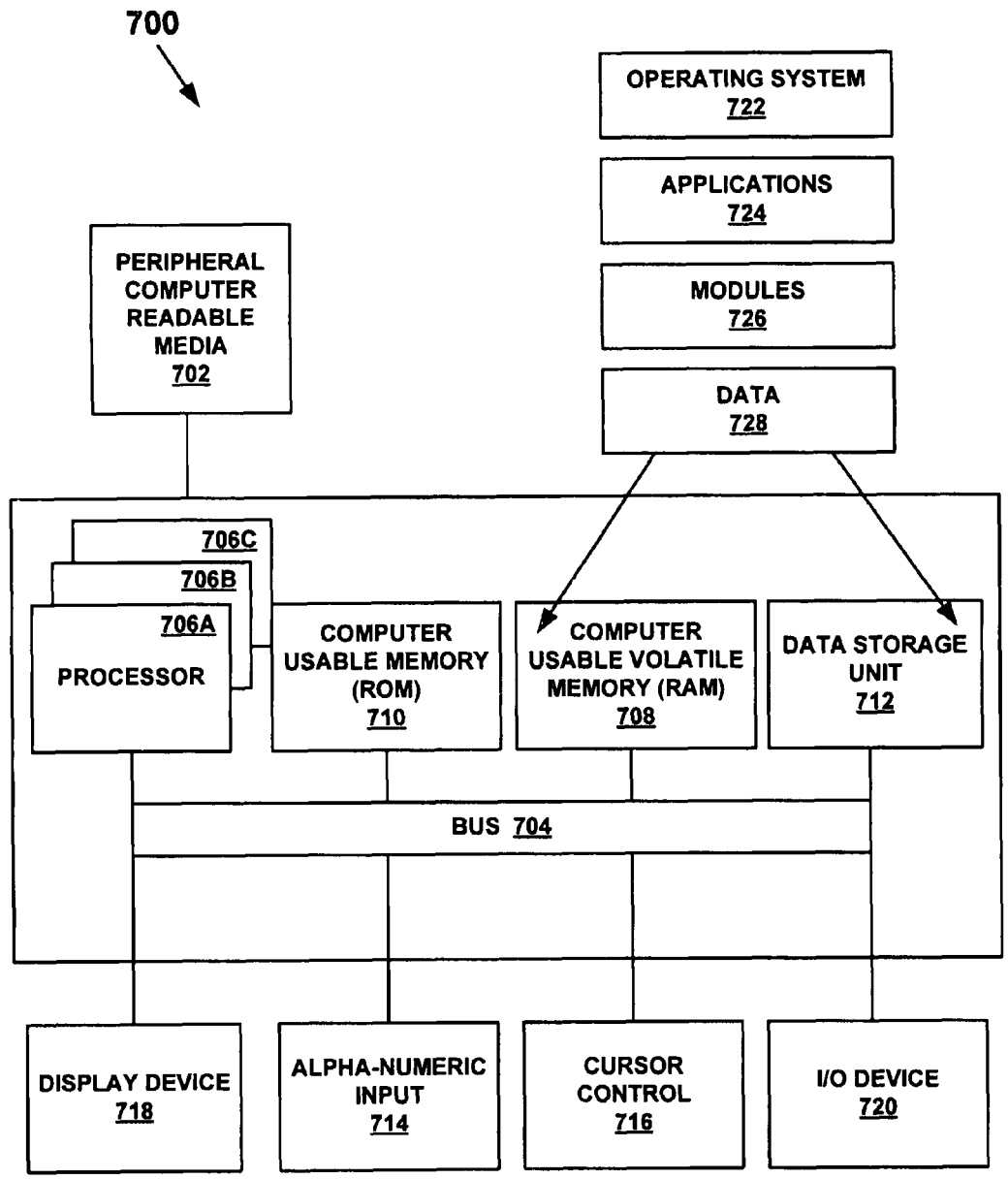
FIG. 7 illustrates an exemplary computer system used in accordance with embodiments of the present invention.

With reference now to FIG. 7, portions of the technology for reducing blur are composed of computer-readable and computer-executable instructions that reside, for example, in computer-usable media of a computer system. That is, FIG. 7 illustrates one example of a type of computer that can be used to implement embodiments, which are discussed below, of the present technology for reducing blur.

FIG. 7 illustrates an exemplary computer system 700 used in accordance with embodiments of the present technology for reducing blur. It is appreciated that system 700 of FIG. 7 is exemplary only and that the present technology for reducing blur can operate on or within a number of different computer systems including general purpose networked computer systems, embedded computer systems, routers, switches, server devices, consumer devices, various intermediate devices/artifacts, stand alone computer systems, and the like. As shown in FIG. 7, computer system 700 of FIG. 7 is well adapted to having peripheral computer readable media 702 such as, for example, a floppy disk, a compact disc, and the like coupled thereto.

System 700 of FIG. 7 includes an address/data bus 704 for communicating information, and a processor 706A coupled to bus 704 for processing information and instructions. As depicted in FIG. 7, system 700 is also well suited to a multi-processor environment in which a plurality of processors 706A, 706B, and 706C are present. Conversely, system 700 is also well suited to having a single processor such as, for example, processor 706A. Processors 706A, 706B, and 706C may be any of various types of microprocessors. System 700 also includes data storage features such as a computer usable volatile memory 708, e.g. random access memory (RAM), coupled to bus 704 for storing information and instructions for processors 706A, 706B, and 706C.

System 700 also includes computer usable non-volatile memory 710, e.g. read only memory (ROM), coupled to bus 704 for storing static information and instructions for processors 706A, 706B, and 706C. Also present in system 700 is a data storage unit 712 (e.g., a magnetic or optical disk and disk drive) coupled to bus 704 for storing information and instructions. System 700 also includes an optional alphanumeric input device 714 including alphanumeric and function keys coupled to bus 704 for communicating information and command selections to processor 706A or processors 706A, 706B, and 706C. System 700 also includes an optional cursor control device 716 coupled to bus 704 for communicating user input information and command selections to processor 706A or processors 706A, 706B, and 706C. System 700 of the present embodiment also includes an optional display device 718 coupled to bus 704 for displaying information.

Referring still to FIG. 7, optional display device 718 of FIG. 7 may be a liquid crystal device, cathode ray tube, plasma display device or other display device suitable for creating graphic images and alphanumeric characters recognizable to a user. Optional cursor control device 716 allows the computer user to dynamically signal the movement of a visible symbol (cursor) on a display screen of display device 718. Many implementations of cursor control device 716 are known in the art including a trackball, mouse, touch pad, joystick or special keys on alpha-numeric input device 714 capable of signaling movement of a given direction or manner of displacement. Alternatively, it will be appreciated that a cursor can be directed and/or activated via input from alpha-numeric input device 714 using special keys and key sequence commands.

System 700 is also well suited to having a cursor directed by other means such as, for example, voice commands. System 700 also includes an I/O device 720 for coupling system 700 with external entities. For example, in one embodiment, I/O device 720 is a network adapter for enabling wired or wireless communications between system 700 and an external network such as, but not limited to, the Internet.

Referring still to FIG. 7, various other components are depicted for system 700. Specifically, when present, an operating system 722, applications 724, modules 726, and data 728 are shown as typically residing in one or some combination of computer usable volatile memory 708, e.g. random access memory (RAM), and data storage unit 712. In one embodiment, the present technology for location awareness of network devices, for example, is stored as an application 724 or module 726 in memory locations within RAM 708 and memory areas within data storage unit 712.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A method for reducing blur comprising:

accessing a blurred image, said blurred image having a width and a length wherein said width and said length can be different;

converting said blurred image into a frequency domain representation of said blurred image;

determining an angle of blur from said frequency domain representation of said blurred image;

rotating said frequency domain representation of said blurred image by said angle of blur;

determining a size of said blur from said rotated frequency domain representation of said blurred image, wherein said size of said blur is a velocity of motion of said blur;

determining a blur kernel associated with said blur, said blur kernel comprising said angle of blur and said size of said blur; and de-convoluting said blurred image according to said blur kernel to reduce said blur.

2. The method of claim 1 wherein said determining said angle of blur from said frequency domain of said blurred image comprises:

identifying a band of high pixel values from said frequency domain representation of said blurred image.

3. The method of claim 2 wherein said angle of blur is perpendicular to said band of high pixel values.

4. The method of claim 1 wherein said de-convoluting is performed automatically.

5. The method of claim 1 wherein said determining said size of said blur from said rotated frequency domain representation of said blurred image comprises:
   identifying a number bands corresponding to low pixel values from said rotated frequency domain representation of said blurred image.

6. The method of claim 5 wherein said size of said blur is determined by adding a constant to said number of bands corresponding to low pixel values from said rotated frequency domain representation of said blurred image.

7. A computer-readable medium having computer-readable instructions stored thereon causing a computer to perform the steps of:
   accessing a blurred image, said blurred image having a width and a length wherein said width and said length can be different;
   converting said blurred image into a frequency domain representation of said blurred image;
   determining an angle of blur from said frequency domain representation of said blurred image;
   rotating said frequency domain representation of said blurred image by said angle of blur;
   determining a size of said blur from said rotated frequency domain representation of said blurred image, wherein said size of said blur is a velocity of motion of said blur;
   determining a blur kernel associated with said blur, said blur kernel comprising said angle of blur and said size of said blur; and
   de-convoluting said blurred image according to said blur kernel to reduce said blur.

8. The computer-readable medium of claim 7 wherein said determining said angle of blur from said frequency domain of said blurred image comprises:
   filtering a portion of said frequency domain representation; and
   identifying a band of high pixel values by processing said portion of said frequency domain representation of said blurred image.

9. The computer-readable medium of claim 8 wherein said angle of blur is perpendicular to said band of high pixel values.

10. The computer-readable medium of claim 7 wherein said de-convoluting is performed automatically.

11. The computer-readable medium of claim 7 wherein said determining said size of said blur from said rotated frequency domain of said blurred image comprises:
    identifying a number bands corresponding to low pixel values from said rotated frequency domain representation of said blurred image.

12. The computer-readable medium of claim 11 wherein said size of said blur is determined by adding a constant to said number of bands corresponding to low pixel values from said rotated frequency domain representation of said blurred image.

13. A system for reducing blur comprising:
    an image accessor module for accessing a blurred image, said blurred image having a width and a length wherein said width and said length can be different;
    an image domain converter module for converting said blurred image into a frequency domain representation of said blurred image;
    a blur angle determiner module for determining an angle of blur from said frequency domain of said blurred image;
    a blur size determiner module for rotating said frequency domain representation of said blurred image by said angle of blur and for determining a size of said blur from said rotated frequency domain representation of said blurred image, wherein said size of said blur is a velocity of motion of said blur;
    a blur kernel determiner module for determining a blur kernel associated with said blur, said blur kernel comprising said angle of blur and said size of said blur; and
    an image de-convoluting module for de-convoluting said blurred image according to said blur kernel to reduce said blur.

14. The system of claim 13 wherein said blur angle determiner module identifies a band of high pixel values from said frequency domain representation of said blurred image.

15. The system of claim 14 wherein said angle of blur is perpendicular to said band of high pixel values.

16. The system of claim 13 wherein said image blur reducing module de-convolutes said blurred image automatically without requiring user input.

17. The system of claim 13 wherein said blur size determiner module identifies a number bands corresponding to low pixel values from said rotated frequency domain representation of said blurred image.

* * * * *